United States Patent

Singer et al.

(10) Patent No.: US 11,119,218 B2
(45) Date of Patent: Sep. 14, 2021

(54) COHERENT LIDAR SYSTEM WITH EXTENDED FIELD OF VIEW

(71) Applicant: GM Global Technology Operations LLC, Detroit, MI (US)

(72) Inventors: Scott Singer, San Gabriel, CA (US); Lute Maleki, Pasadena, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 707 days.

(21) Appl. No.: 15/944,197

(22) Filed: Apr. 3, 2018

(65) Prior Publication Data

US 2019/0302268 A1  Oct. 3, 2019

(51) Int. Cl.
| | |
|---|---|
| G01S 17/931 | (2020.01) |
| G01S 7/481 | (2006.01) |
| G01S 17/08 | (2006.01) |
| G01S 17/26 | (2020.01) |
| G01S 17/34 | (2020.01) |
| G01S 17/32 | (2020.01) |
| G01S 17/36 | (2006.01) |

(52) U.S. Cl.
CPC .......... *G01S 17/931* (2020.01); *G01S 7/4817* (2013.01); *G01S 17/08* (2013.01); *G01S 17/26* (2020.01); *G01S 17/32* (2013.01); *G01S 17/34* (2020.01); *G01S 17/36* (2013.01)

(58) Field of Classification Search
None
See application file for complete search history.

(56) References Cited

U.S. PATENT DOCUMENTS

| | | | | |
|---|---|---|---|---|
| 4,042,822 A | * | 8/1977 | Brandewie | G01S 7/4812 250/216 |
| 4,171,159 A | * | 10/1979 | White | G01S 17/32 356/502 |
| 4,311,385 A | * | 1/1982 | Keene | G01B 11/26 356/139.08 |
| 6,570,695 B1 | * | 5/2003 | Pribil | H04B 10/1121 398/121 |
| 10,422,868 B2 | * | 9/2019 | Efimov | G01S 17/95 |
| 2017/0090031 A1 | * | 3/2017 | Bondy | G01S 7/4911 |
| 2018/0081031 A1 | * | 3/2018 | Yuan | G01S 17/34 |
| 2018/0284237 A1 | * | 10/2018 | Campbell | G01S 17/42 |
| 2019/0064358 A1 | * | 2/2019 | Desai | H01S 5/02252 |
| 2019/0257927 A1 | * | 8/2019 | Yao | G01S 7/4815 |
| 2019/0391243 A1 | * | 12/2019 | Nicolaescu | G01S 7/4817 |

* cited by examiner

*Primary Examiner* — Yuqing Xiao
*Assistant Examiner* — Amir J Askarian
(74) *Attorney, Agent, or Firm* — Cantor Colburn LLP (57) ABSTRACT

A coherent lidar system, a method of assembling the system and a vehicle including the system involve a light source to output a continuous wave, and a modulator to modulate a frequency of the continuous wave and provide a frequency modulated continuous wave (FMCW) signal. The system includes a a splitter to split the FMCW signal to two or more paths, and two or more aperture lenses. At least one of the two or more aperture lenses is associated with each of the two or more paths and is configured to obtain a receive beam resulting from a reflection of an output signal obtained from the FMCW signal.

18 Claims, 6 Drawing Sheets

COHERENT LIDAR SYSTEM WITH EXTENDED FIELD OF VIEW

INTRODUCTION

The subject disclosure relates to a coherent lidar system with an extended field of view.

Vehicles (e.g., automobiles, trucks, construction equipment, farm equipment, automated factory equipment) increasingly include sensors that obtain information about the vehicle operation and the environment around the vehicle. Some sensors, such as cameras, radio detection and ranging (radar) systems, and lidar systems can detect and track objects in the vicinity of the vehicle. By determining the relative location and heading of objects around the vehicle, vehicle operation may be augmented or automated to improve safety and performance. For example, sensor information may be used to issue alerts to the driver of the vehicle or to operate vehicle systems (e.g., collision avoidance systems, adaptive cruise control system, autonomous driving system). A coherent lidar system transmits frequency modulated continuous wave (FMCW) light and processes reflected beams to determine information about the target. Generally, one light source supports the transmission of light by one scanning mechanism, referred to here as a beam steering mechanism (e.g. an actuated mirror), and aperture lens. Thus, one light source facilitates coverage of a field of view associated with the scanning mechanism and aperture. Accordingly, it is desirable to provide a coherent lidar system with an extended field of view.

SUMMARY

In one exemplary embodiment, a coherent lidar system includes a light source to output a continuous wave, and a modulator to modulate a frequency of the continuous wave and provide a frequency modulated continuous wave (FMCW) signal. The system also includes a splitter to split the FMCW signal to two or more paths, and two or more aperture lenses. At least one of the two or more aperture lenses is associated with each of the two or more paths and is configured to obtain a receive beam resulting from a reflection of an output signal obtained from the FMCW signal.

In addition to one or more of the features described herein, the splitter splits the FMCW signal with equal power to each of the two or more paths.

In addition to one or more of the features described herein, the splitter splits the FMCW signal to each of the two or more paths with power of the FMCW signal output to at least one of the two or more paths differing from power of the FMCW signal output to at least another of the two or more paths.

In addition to one or more of the features described herein, the system also includes a beam steering device associated with each of the at least one of the two or more aperture lenses associated with each of the two or more paths. Each beam steering device is associated with a field of view and a total field of view of the system is greater than the field of view associated with any of the beam steering devices.

In addition to one or more of the features described herein, the system also includes an optical amplifier associated with each of the two or more paths to respectively amplify the FMCW signal provided by the splitter to each of the two or more paths.

In addition to one or more of the features described herein, the system also includes a beam splitter associated with each of the two or more paths that is configured to split the FMCW signal from the splitter into the output signal and a local oscillator (LO) signal, and an alignment element configured to align the LO signal and the receive beam to produce a co-linear signal.

In addition to one or more of the features described herein, the system also includes one or more photodetectors associated with each of the two or more paths, each of the one or more photodetectors obtaining an interference result based on interference between the LO signal and the amplified receive beam in the co-linear signal.

In addition to one or more of the features described herein, at least one of the two or more paths is monostatic and uses the same one of the two or more apertures to transmit the output signal and obtain the receive beam.

In addition to one or more of the features described herein, the system also includes a circulator to direct the output signal to the one of the two or more apertures and direct the receive beam to a receive path.

In addition to one or more of the features described herein, the system is within or on a vehicle and is configured to detect a location and speed of an object relative to the vehicle.

In another exemplary embodiment, a method of assembling a coherent lidar system includes arranging a light source to output a continuous wave, and disposing elements to modulate the continuous wave and provide a frequency modulated continuous wave (FMCW) signal. The method also includes arranging a splitter to split the FMCW signal to two or more paths, and arranging two or more aperture lenses. At least one of the two or more aperture lenses is associated with each of the two or more paths, and one of the at least one of the two or more aperture lenses associated with each of the two or more paths is positioned to obtain a receive beam resulting from a reflection of an output signal obtained from the FMCW signal.

In addition to one or more of the features described herein, the arranging the splitter includes configuring the splitter to split the FMCW signal with equal power to each of the two or more paths.

In addition to one or more of the features described herein, the arranging the splitter includes configuring the splitter to split the FMCW signal to each of the two or more paths with power of the FMCW signal output to at least one of the two or more paths differing from power of the FMCW signal output to at least another of the two or more paths.

In addition to one or more of the features described herein, the method also includes arranging a beam steering device adjacent to each of the at least one of the two or more aperture lenses associated with each of the two or more paths.

In addition to one or more of the features described herein, the method also includes positioning an optical amplifier associated with each of the two or more paths to respectively amplify the FMCW signal provided by the splitter to each of the two or more paths.

In yet another exemplary embodiment, a vehicle includes a coherent lidar system with a light source to output a continuous wave, and a modulator to modulate a frequency of the continuous wave and provide a frequency modulated continuous wave (FMCW) signal. The coherent lidar system also includes a splitter to split the FMCW signal to two or more paths, and two or more aperture lenses. At least one of the two or more aperture lenses is associated with each of the two or more paths and is configured to obtain a receive beam resulting from a reflection of an output signal obtained from the FMCW signal. The vehicle also includes a vehicle controller to augment or automate operation of the vehicle based on information from the coherent lidar system.

In addition to one or more of the features described herein, the splitter splits the FMCW signal with equal power to each of the two or more paths.

In addition to one or more of the features described herein, the splitter splits the FMCW signal to each of the two or more paths with power of the FMCW signal output to at least one of the two or more paths differing from power of the FMCW signal output to at least another of the two or more paths.

In addition to one or more of the features described herein, the coherent lidar system also includes a beam steering device associated with each of the at least one of the two or more aperture lenses associated with each of the two or more paths. Each beam steering device is associated with a field of view and a total field of view of the system is greater than the field of view associated with any of the beam steering devices.

In addition to one or more of the features described herein, the coherent lidar system also includes an optical amplifier associated with each of the two or more paths to respectively amplify the FMCW signal provided by the splitter to each of the two or more paths.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

As previously noted, sensors may be used to augment or automate vehicle operation. As also noted, one type of sensor is a coherent lidar system that transmits an FMCW signal. The system takes advantage of phase coherence between the transmitted FMCW signal and a reflected signal resulting from reflection of the transmitted FMCW signal by a target. The interference between the reflected signal and a copy of the transmitted signal is used to determine information such as target distance and speed. The coherent lidar system differs from time-of-flight lidar systems that transmit a series of pulses and use the duration for transmission of each pulse and reception of the resulting reflection to determine a set of distances for the target.

Embodiments of the systems and methods detailed herein relate to a coherent lidar system with an extended field of view. Specifically, the FMCW signal produced by a single light source is used to drive multiple scanners (i.e., be output from more than one aperture). Each scanner defines a field of view, which is a range of angles in azimuth and elevation. Thus, the ability to drive multiple scanners, with partial or non-overlapping fields of view, extends the total field of view of the lidar system as a whole. A scanner refers to a beam steering device that steers the light beam output by the lidar system to scan over a given field of view. The field of view using a given scanner may be, for example, 60 to 120 degrees. Thus, based on the number of scanners that are used to transmit light and on their placement, a single light source may be used to extend the field of view beyond 120 degrees and up to 360 degrees.

Figure 1:
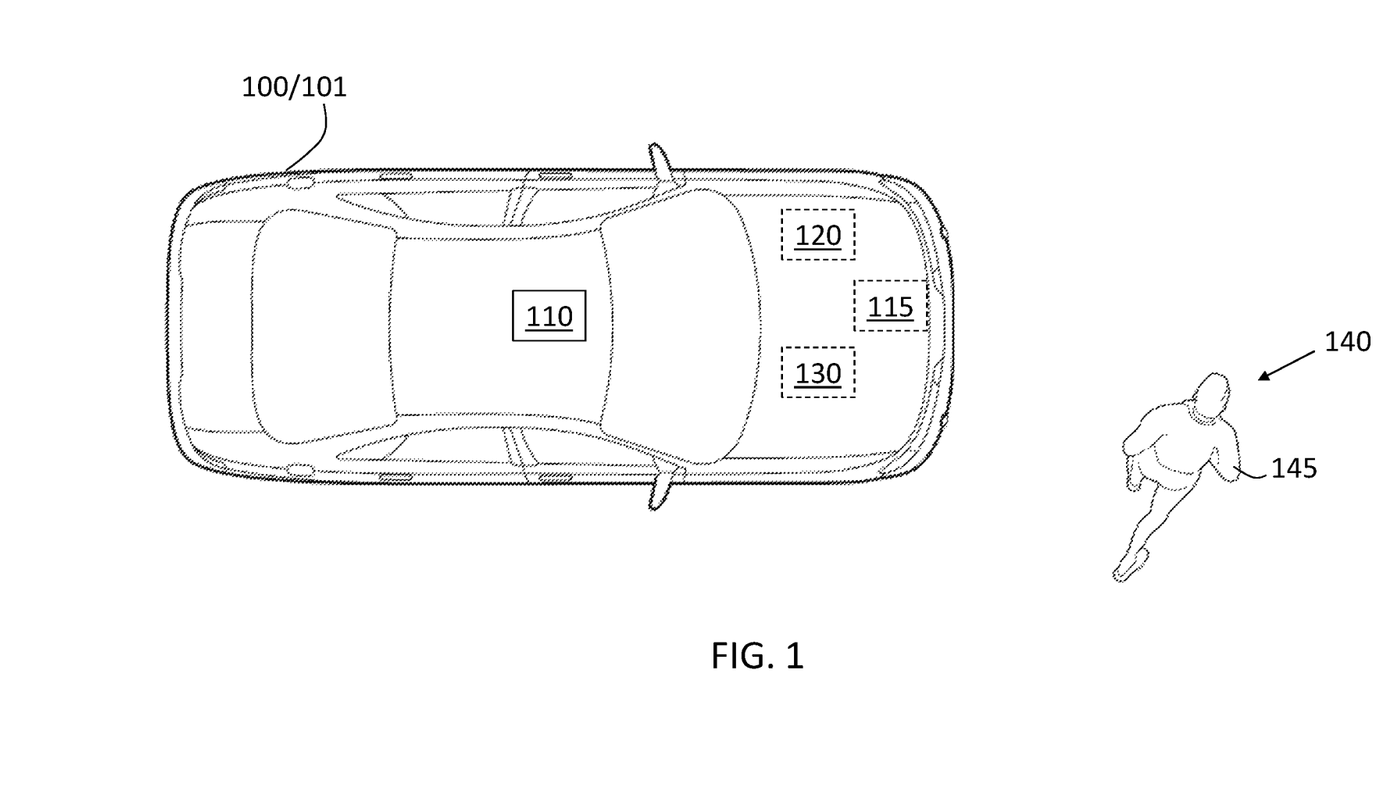
FIG. 1 is a block diagram of a scenario involving a coherent lidar system with an extended field of view according to one or more embodiments.
Figure 2:
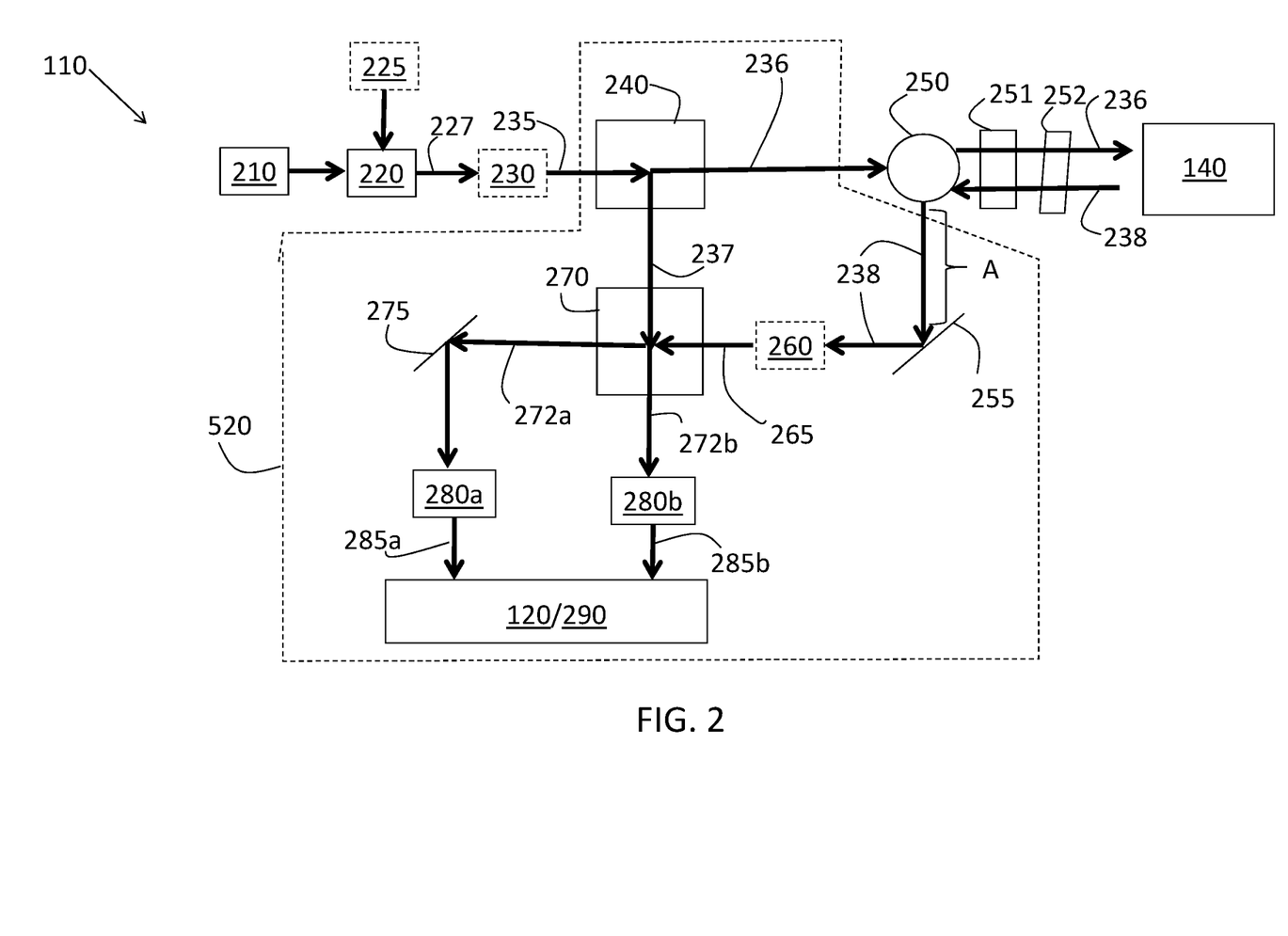
FIG. 2 is a block diagram detailing a portion of the lidar system with an extended field of view according to one or more embodiments.

In accordance with an exemplary embodiment, FIG. 1 is a block diagram of a scenario involving a coherent lidar system 110 with an extended field of view. The vehicle 100 shown in FIG. 1 is an automobile 101. A coherent lidar system 110, further detailed with reference to FIG. 2, is shown on the roof of the automobile 101. According to alternate or additional embodiments, one or more lidar systems 110 may be located elsewhere on the vehicle 100. The coherent lidar system 110 may be implemented with free-standing optical elements or using on-chip integration. Another sensor 115 (e.g., camera, microphone, radar system) is shown, as well. Information obtained by the lidar system 110 and one or more other sensors 115 may be provided to a controller 120 (e.g., electronic control unit (ECU)).

The controller 120 may use the information to control one or more vehicle systems 130. In an exemplary embodiment, the vehicle 100 may be an autonomous vehicle and the controller 120 may perform known vehicle operational control using information from the lidar system 110 and other sources. In alternate embodiments, the controller 120 may augment vehicle operation using information from the lidar system 110 and other sources as part of a known system (e.g., collision avoidance system, adaptive cruise control system). The lidar system 110 and one or more other sensors 115 may be used to detect objects 140, such as the pedestrian 145 shown in FIG. 1. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 3:
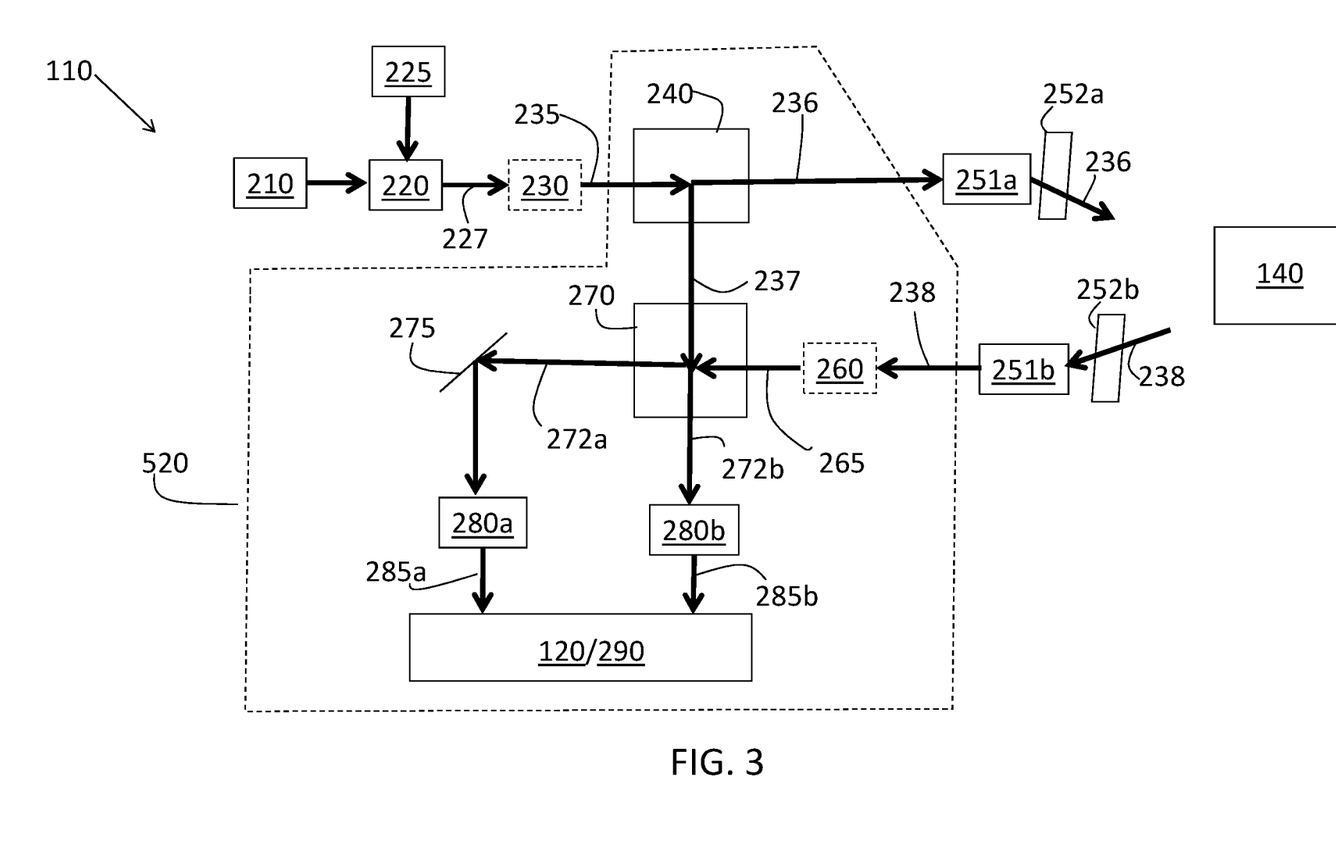
FIG. 3 is a block diagram a portion of the lidar system with an extended field of view according to alternate one or more embodiments.
Figure 5:
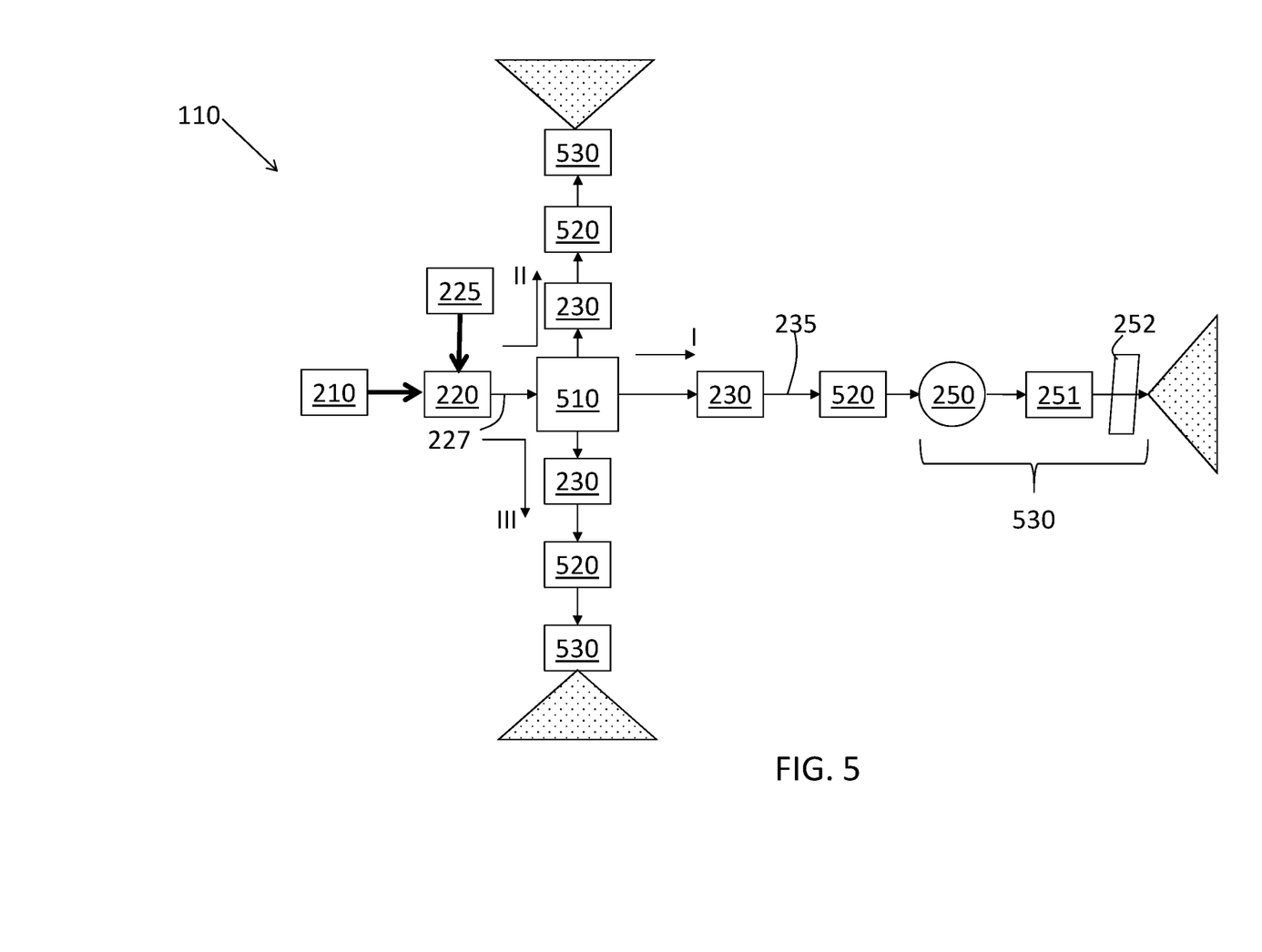
FIG. 5 is a block diagram of the lidar system with an extended field of view according to one or more embodiments.

FIGS. 2 and 3 detail one branch of the lidar system 110 according to exemplary embodiments. FIG. 5 illustrates an exemplary lidar system 110 with three such branches to extend the field of view. FIG. 2 details a monostatic system while FIG. 3 details a bistatic system.

FIG. 2 is a block diagram detailing a portion of the lidar system 110 with an extended field of view according to one or more embodiments. As previously noted, FIG. 2 depicts a monostatic lidar system 110, in which transmit and receive paths use the same aperture lens 252. The lidar system 110 includes a light source 210. The light source 210 may be a laser diode such as a distributed feedback (DFB) laser according to an exemplary embodiment. The light source 210 outputs a continuous wave of light, which exhibits a constant amplitude. The next stage in the light output system includes an optical resonator 220.

The resonator 220 is an external optical cavity, external to the light source 210 and, according to the exemplary embodiment shown in FIG. 2, a controlled voltage 225 using a voltage source is applied to the resonator 220 to perform electro-optical modulation and to modulate the frequency of the continuous wave of light in the resonator 220 to produce FMCW light 227. According to the exemplary embodiment, the feedback of some light from the resonator 220 to the light source 210 means that the light generated within the light source 210 and the light output by the resonator 220 are modulated synchronously. The controlled voltage 225 may be increased or decreased linearly in order to produce light that exhibits linear frequency modulation (i.e., a linear FMCW signal). Alternately, the controlled voltage 225 may be varied non-linearly to produce light that exhibits non-linear frequency modulation.

According to alternate embodiments, the FMCW light 227 may be obtained by modulating the frequency at the light source 210 itself. In this case, the controlled voltage 225 applied to the resonator 220, as shown in FIG. 2, may be applied directly to block 210. For example, the bias current of the laser chip may be changed or a physical cavity or mirror of the light source 210 may be modulated. This modulation may be implemented by piezoelectric or micro-electromechanical systems (MEMS) actuation, for example. As FIG. 2 indicates, an optional optical amplifier 230 may be used to amplify the FMCW light 227 output by the resonator 220 to produce the FMCW signal 235.

A beam splitter 240 is used to split the FMCW signal 235 into an output signal 236 and a local oscillator (LO) signal 237. Both the output signal 236 and the LO signal 237 exhibit the frequency modulation imparted by the controlled voltage 225, or other modulator. The beam splitter 240 may be an on-chip waveguide splitter, or a free standing beam splitter, for example. The output signal 236 is provided to a light circulating element, a circulator 250, which is necessary in the monostatic system shown in FIG. 2 to facilitate using the same aperture lens 252 for both the transmit and receive paths. The circulator 250 directs the output signal 236 out of the lidar system 110 through an aperture lens 252. The beam steering device 251, which may also be referred to as a scanner, directs the output signal 236 through the aperture lens 252. As FIG. 3 indicates, in a bistatic system, the circulator 250 is not needed but a second beam steering device 251 and aperture lens 252 are used such that the output signal 236 and receive beam 238 do not traverse the same path.

The beam steering device 251 may be a MEMS scanning mirror or a mirror that is actuated by other mechanisms. The beam steering device 251 may be implemented in other ways, as well, including with mirror galvanometers, using Risley prism beam steering, or by mechanically actuating the entire lidar system 110, for example. If a target 140 is in the field of view of the lidar system 110, as in the example shown in FIG. 2, the FMCW signal 236 output by the circulator 250 is scattered by the target 140. Some of that scattered light reenters the lidar system 110 as a receive beam 238. The receive beam 238 is directed by the circulator 250 to a reflector 255. The reflector 255 directs the receive beam 238 to an optional optical amplifier 260 according to one or more embodiments.

While the optical amplifier 260 is shown between the reflector 255 and an alignment element 270 in FIG. 2, the optical amplifier may instead be located between the circulator 250 and the reflector 255, along the path indicated as "A." According to exemplary embodiments, the optical amplifier 260 may include coupling lenses to direct the receive beam 238 into the optical amplifier 260 without loss. The optical amplifier 260 may also include shaping optics to ensure that the amplified receive beam 265 provided by the optical amplifier 260 has the correct profile. These optional additional elements are further discussed with reference to FIG. 4. As previously noted, this optical amplifier 260 cannot be in the path of the receive beam 238, as shown in FIG. 2, for a time-of-flight lidar system.

The amplified receive beam 265 is provided to the alignment element 270 in which with the amplified receive beam 265 is aligned with the LO signal 237. The alignment element 270 ensures that the amplified receive beam 265 and the LO signal 237 are co-linear and splits the output into two co-linear signals 272a, 272b (generally referred to as 272). The co-linear signals 272a, 272b are respectively directed to a photodetectors 280a, 280b (generally referred to as 280). As FIG. 2 indicates, one of the co-linear signals 272a is reflected by a reflector 275 in order to be directed into the corresponding photodetector 280a. The amplified receive beam 265 and LO signal 237, which are aligned in the co-linear signals 272, interfere with each other in the photodetectors 280. The interference between the amplified receive beam 265 and the LO signal 237 results in a coherent combination of the two beams. Thus, the lidar system 110 is referred to as a coherent lidar system, unlike the time-of-flights systems. The interference in each photodetector 280 represents an autocorrelation function to identify an amplified receive beam 265 that resulted from the output signal 236. This prevents errant light from another light source outside the lidar system 110 that is within the field of view of the lidar system 110 from being mistaken for a receive beam 238 that is reflected by a target 140.

The photodetectors 280 are semiconductor devices that convert the result of the interference between the amplified receive beam 265 and the LO signal 237 in each co-linear signal 272 into electrical currents 285a, 285b (generally referred to as 285). Two photodetectors 280 are used in accordance with a known balanced detector technique to cancel noise that is common to both photodetectors 280. The electrical currents 285 from each of the photodetectors 280 are combined and processed to obtain information like range to the target 140, speed of the target 140, and other information according to known processing techniques. The processing may be performed within the lidar system 110 by a processor 290 or outside the lidar system 110 by the controller 120, for example. The processor 290 may include processing circuitry similar to that discussed for the controller 120. The components of the receive path according to the present embodiment are labeled 520.

FIG. 3 is a block diagram of a portion of the lidar system 110 with an extended field of view according to alternate one or more embodiments. A bistatic lidar system 110, which includes separate transmit and receive beam steering devices 251a, 251b (generally referred to as 251) and aperture lenses 252a, 252b (generally referred to as 252), is shown. Most of the bistatic lidar system 110, shown in FIG. 3, is similar to the monostatic lidar system 110, shown in FIG. 2. Thus, the components detailed with reference to FIG. 2 are not discussed again. As previously noted, the primary difference between the monostatic and bistatic systems is in the inclusion, in the bistatic system, of the separate beam steering devices 251 and aperture lenses 252 for the output signal 236 and receive beam 238. The components of the receive path according to the present exemplary embodiment are also labeled 520.

Figure 4:
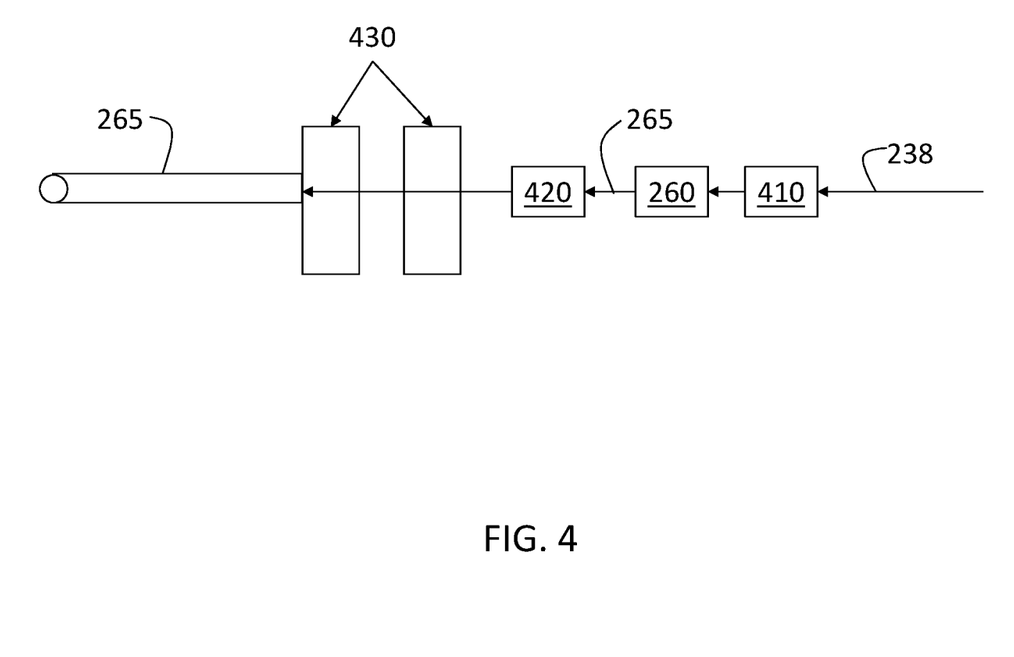
FIG. 4 depicts optional shaping optics that may be included with the optical amplifier according to one or more embodiments.

FIG. 4 depicts optional shaping optics that may be included with the optical amplifier 260 according to one or more embodiments. A coupling lens 410 reduces the diameter of the incoming receive beam 238. For example, if the receive beam 238 has a diameter on the order of 1 millimeter (mm), the coupling lens 410 may reduce that to the order of microns in order to put the receive beam 238 through the optical amplifier 260. On the other side of the optical amplifier 260, a collimating lens 420 restores the diameter of the amplified receive beam 265. An anamorphic prism pair 430 ensures a desired shape for the cross-section of the amplified receive beam 265. For example, in the exemplary embodiment shown in FIG. 4, the amplified receive beam 265 has a circular cross-sectional shape.

FIG. 5 is a block diagram of the lidar system 110 with an extended field of view according to one or more embodiments. For simplicity, a monostatic system is shown, but it should be clear from FIGS. 2 and 3, and the related discussion, that a bistatic system may be used for each portion of the extended field of view lidar system 110, as well. Three portions I, II, III are shown in the exemplary lidar system 110 of FIG. 5. Portion generally refers to a set of elements that ultimately output the output signal 236 and receive and process the receive beam 238. While three portions I, II, III are shown for explanatory purposes, two or more portions may be used to extend the field of view that would be achieved with the exemplary single portion, as shown in the FIGS. 2 and 3.

The FMCW light 227 output by the resonator 220 is split by a splitter 510 to each of the three portions shown in FIG. 5. The splitter 510 is an optical element and may be an on-chip waveguide splitter. According to exemplary embodiments, the splitter 510 may be comprised of multiple beam splitters to generate multiple branches of splits (i.e., multiple sets of portions) that each direct light to a corresponding transmitting and receiving portion. The splitter 510 may split the light equally. For example, if the FMCW light 227 has 15 milliwatts (mW) of power, each of the three portions I, II, III in FIG. 5 may receive the FMCW light 227 with 5 mW of power. In alternate embodiments, the split of the MFCW light 227 may be unequal. For example, portion I may be used for long-range scanning and receive 10 mW of power while the other two portions II, III receive 2.5 mW each.

Each of the portions I, II, III is shown to include an optical amplifier 230. The optical amplifier 230 may have a saturated regime such that any FMCW light 227 with power greater than a threshold power value will be amplified to a set amplification power. For example, any input greater than 5 mW may be amplified to 70 mW. Thus, according to an exemplary embodiment, the light source 210 may be configured to output at least N times the threshold power value for the optical amplifier 230, where N is the number of portions (e.g., N=3 with portions I, II, and III in the exemplary case). Further, the splitter 510 may be configured to impart at least the threshold power value to each portion.

Each of the portions I, II, III is also shown to include the components of the receive path labeled as 520 in FIGS. 2 and 3. These are not expanded in FIG. 5 for simplicity. As previously noted, the components of the receive path labeled as 520 may be as shown in FIG. 2 for a monostatic system or as shown in FIG. 3 for a bistatic system. Portion I in FIG. 5 indicates the circulator 250, beam steering device 251, and aperture lens 252 as 530. These components labeled as 530 are also part of the other two portions II, III, as indicated. In the exemplary embodiment shown in FIG. 5, the single light source 210 ultimately drives three portions I, II, III and, thus, facilitates an expanded field of view beyond what could be achieved with just one of the portions I, II, III.

While the portions I and II and the portions I and III are shown 90 degrees apart from each other, the arrangement and relative orientation of the two or more portions of the lidar system 110 according to one or more embodiments is not limited in three-dimensional space. Further, the beam steering device 251 associated with each portion may not result in the same field of view for each portion. For example, in the exemplary lidar system 110 shown in FIG. 5, portion I may cover a 90 degree by 40 degree field of view with a center at 0 degrees azimuth and 0 degrees elevation (front viewing on the vehicle). Portion II may cover a 40 degree by 20 degree field of view with a center at 180 degrees azimuth and 0 degrees elevation (rear viewing on the vehicle 100). Portion III may cover a 40 degree by 40 degree field of view oriented at 270 degrees azimuth and 20 degrees elevation (covering the right side blind spot of the vehicle 100 and facing slightly downward). In this way, one light source 210 can expand the coverage of the overall lidar system 110.

Figure 6:
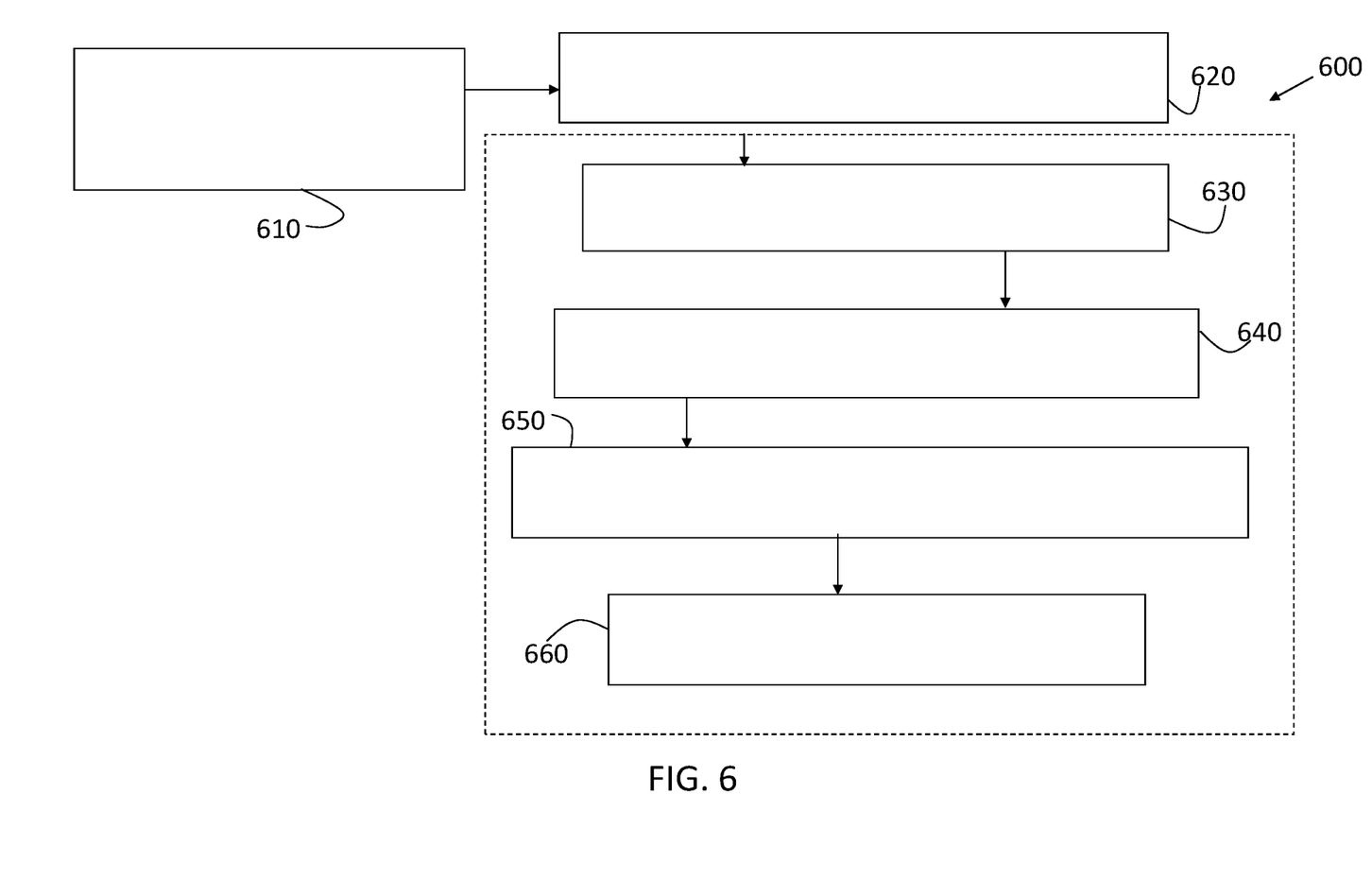
FIG. 6 is a process flow of a method of assembling a coherent lidar system with an extended field of view according to one or more embodiments.

FIG. 6 is a process flow 600 of a method of assembling a coherent lidar system 110 with an extended field of view according to one or more embodiments. As previously noted, the lidar system 110 may be a monostatic or bistatic system. Specifically, each portion that obtains the FMCW signal 227 may be a monostatic or bistatic system. At block 610, arranging a light source 210 and additional elements to output the FMCW signal 227 includes arranging the resonator 220 and a modulating element such as the controlled voltage 225 to output the FMCW signal 227. Arranging a splitter 510 to split the FMCW signal 227 for use by two or more portions may include arranging a splitter 510 that is comprised of multiple splitters to subdividing the FMCW signal 227 further, for example. As previously noted, the splitter 510 may equally or unequally divide the power of the incoming FMCW signal 227 to each of the portions. The remaining processes, at blocks 630 through 660, are repeated for each of the portions to which a split of the FMCW signal 227 is provided by the splitter 510.

At block 630, the processes include amplifying the FMCW signal 227 provided by the splitter 510 and arranging a beam splitter 240 to produce an output signal 236 and LO signal 237. As previously noted, the LO signal 237 is needed to ultimately interfere with the received reflection. At block 640, arranging elements to transmit the output signal 236 and obtain the receive beam 238 includes arranging the circulator 250 in the monostatic system. In addition, one or more beam steering devices 251 and associated one or more apertures may be positioned such that the beam steering device 251 steers the output signal 236 through an aperture lens 252 and the receive beam 238 from the aperture lens 252.

At block 650, arranging an alignment element 270 to align the receive beam 238 with the LO signal 237 may additionally include arranging an optical amplifier 260 to amplify the receive beam 238 and produce an amplified receive beam 265. The receive beam 238 or, optionally, the amplified receive beam 265 is made co-linear with the LO signal 237 in the alignment element 270. The alignment element 270 outputs the co-linear signal 272 to one or more paths. Disposing photodiodes 280 and a processor 120, 290 to detect and process coherent signals, at block 660, refers to each of the paths of the co-linear signal 272 being processed to obtain information about one or more targets 140.

Each photodiode 280 facilitates interference between the receive beam 238 or, optionally, the amplified receive beam 265 and the LO signal 237 in the corresponding co-linear signal 272. This interference results in a coherent combination that is provided to the processor 120, 290 to determine target 140 distance and speed, as discussed with reference to FIG. 2, for example.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A coherent lidar system, comprising:
a light source configured to output a continuous wave;
a modulator configured to modulate a frequency of the continuous wave and provide a frequency modulated continuous wave (FMCW) signal;
a splitter configured to split the FMCW signal to two or more paths;
two or more aperture lenses, wherein at least one of the two or more aperture lenses is associated with each of the two or more paths and is configured to obtain a receive beam resulting from a reflection of an output signal obtained from the FMCW signal;
a beam splitter associated with each of the two or more paths that is configured to split the FMCW signal from the splitter into the output signal and a local oscillator (LO) signal;
an alignment element configured to align the LO signal and the receive beam to produce a co-linear signal and to split the co-liner signal into two or more co-linear signals; and
two or more photodetectors associated with each of the two or more paths, each of the two or more photodetectors being configured to obtain an interference result based on interference between the LO signal and an amplified receive beam in one of the two or more co-linear signals.

2. The system according to claim 1, wherein the splitter is further configured to split the FMCW signal with equal power to each of the two or more paths.

3. The system according to claim 1, wherein the splitter is further configured to split the FMCW signal to each of the two or more paths with power of the FMCW signal output to at least one of the two or more paths differing from power of the FMCW signal output to at least another of the two or more paths.

4. The system according to claim 1, further comprising a beam steering device associated with each of the at least one of the two or more aperture lenses associated with each of the two or more paths, wherein each beam steering device is associated with a field of view and a total field of view of the system is greater than the field of view associated with any of the beam steering devices.

5. The system according to claim 1, further comprising an optical amplifier associated with each of the two or more paths to respectively amplify the FMCW signal provided by the splitter to each of the two or more paths.

6. The system according to claim 1, wherein at least one of the two or more paths is monostatic and uses the same one of the two or more apertures to transmit the output signal and obtain the receive beam.

7. The system according to claim 6, further comprising a circulator configured to direct the output signal to the one of the two or more apertures and direct the receive beam to a receive path.

8. The system according to claim 1, wherein the system is within or on a vehicle and is configured to detect a location and speed of an object relative to the vehicle.

9. A method of assembling a coherent lidar system, the method comprising:
arranging a light source to output a continuous wave;
disposing elements to modulate the continuous wave and provide a frequency modulated continuous wave (FMCW) signal;
arranging a splitter to split the FMCW signal to two or more paths;
arranging two or more aperture lenses, wherein at least one of the two or more aperture lenses is associated with each of the two or more paths, and one of the at least one of the two or more aperture lenses associated with each of the two or more paths is positioned to obtain a receive beam resulting from a reflection of an output signal obtained from the FMCW signal;
arranging a beam splitter in each of the two or more paths that is configured to split the FMCW signal from the splitter into the output signal and a local oscillator (LO) signal;
arranging an alignment element that is configured to align the LO signal and the receive beam to produce a co-linear signal and to split the co-liner signal into two or more co-linear signals; and
disposing two or more photodetectors associated with each of the two or more paths, each of the two or more photodetectors being arranged to obtain an interference result based on interference between the LO signal and an amplified receive beam in one of the two or more co-linear signals.

10. The method according to claim 9, wherein the arranging the splitter includes configuring the splitter to split the FMCW signal with equal power to each of the two or more paths.

11. The method according to claim 9, wherein the arranging the splitter includes configuring the splitter to split the FMCW signal to each of the two or more paths with power of the FMCW signal output to at least one of the two or more paths differing from power of the FMCW signal output to at least another of the two or more paths.

12. The method according to claim 9, further comprising arranging a beam steering device adjacent to each of the at least one of the two or more aperture lenses associated with each of the two or more paths.

13. The method according to claim 9, further comprising positioning an optical amplifier associated with each of the two or more paths to respectively amplify the FMCW signal provided by the splitter to each of the two or more paths.

14. A vehicle comprising:
a coherent lidar system comprising:
a light source configured to output a continuous wave;
a modulator configured to modulate a frequency of the continuous wave and provide a frequency modulated continuous wave (FMCW) signal;
a splitter configured to split the FMCW signal to two or more paths;

two or more aperture lenses, wherein at least one of the two or more aperture lenses is associated with each of the two or more paths and is configured to obtain a receive beam resulting from a reflection of an output signal obtained from the FMCW signal;

a beam splitter associated with each of the two or more paths that is configured to split the FMCW signal from the splitter into the output signal and a local oscillator (LO) signal;

an alignment element configured to align the LO signal and the receive beam to produce a co-linear signal and to split the co-liner signal into two or more co-linear signals;

two or more photodetectors associated with each of the two or more paths, each of the two or more photodetectors being configured to obtain an interference result based on interference between the LO signal and an amplified receive beam in one of the two or more co-linear signals; and a vehicle controller configured to augment or automate operation of the vehicle based on information from the coherent lidar system.

15. The vehicle according to claim 14, wherein the splitter is further configured to split the FMCW signal with equal power to each of the two or more paths.

16. The vehicle according to claim 14, wherein the splitter is further configured to split the FMCW signal to each of the two or more paths with power of the FMCW signal output to at least one of the two or more paths differing from power of the FMCW signal output to at least another of the two or more paths.

17. The vehicle according to claim 14, wherein the coherent lidar system further comprises a beam steering device associated with each of the at least one of the two or more aperture lenses associated with each of the two or more paths, wherein each beam steering device is associated with a field of view and a total field of view of the system is greater than the field of view associated with any of the beam steering devices.

18. The vehicle according to claim 14, wherein the coherent lidar system further comprises an optical amplifier associated with each of the two or more paths to respectively amplify the FMCW signal provided by the splitter to each of the two or more paths.

* * * * *